INVENTORS
George A. Johnston
Robert C. Douglass
BY Edward M. Steuterman
ATTORNEY even# United States Patent Office 3,511,473
Patented May 12, 1970

3,511,473
FLUID FLOW VALVE
Robert C. Douglass and George A. Johnston, Moline,
Ill., assignors to American Air Filter Company, Inc.,
Louisville, Ky., a corporation of Delaware
Filed May 22, 1968, Ser. No. 731,252
Int. Cl. F16k 7/16
U.S. Cl. 251—285                                 2 Claims

ABSTRACT OF THE DISCLOSURE

A fluid flow control valve having a diaphragm valve closing arrangement disposed within a housing defining the valve body through which fluid flows. The diaphragm can be moved to sealing relation with the seat to selectively close off fluid through the valve and can be moved relative to the valve seat by cooperative valve stem means to regulate fluid flow through the valve. Means are attached to the valve body to engage the valve stem to limit movement of the diaphragm, and opening of the valve, by restricting the permissible length of travel of the stem.

BACKGROUND OF THE INVENTION

In various applications it is desirable to provide valves which can be selectively opened and closed and which also includes means to adjustably limit the opening of the valves to control the maximum fluid flow rate through the valves. One example of such an application is in air conditioning systems where tempering fluid is circulated through heat exchange means, for example ventilators at various locations within a building, to heat or cool the air in the building. In such applications it is desirable to establish a maximum flow of tempering fluid to each individual heat transfer apparatus to make certain that all of the heat exchangers receive an adequate supply of the tempering fluid and to avoid a situation where most of the tempering fluid is undesirably supplied to only a few heat exchangers. To accomplish this purpose such valves are installed in tempering fluid supply systems downstream of the heat exchange means to limit the maximum flow of tempering fluid to each heat exchanger. The valves can likewise be used to completely shut off flow of tempering fluid to the heat exchanger.

In some previous applications rising stem type valves, where the valve member is lifted away from the valve by the valve stem, have been used. In some valves complex castings have been required to provide desirable flow limiting features for such valves while in other valves machined parts have been required for the valve or the valve bonnet to adjustably limit the valve opening. In many cases such machined elements have been very fragile and not capable of withstanding adverse conditions. Various other types of valves, including valves with non-rising stems, have provided means to limit the maximum opening of the valve by limiting the number of rotations of the valve handle or stem. Moreover, in many previous valves the elements associated with the opening of the valve have been exposed to the fluid carried by the valve and have been subject to corrosion.

SUMMARY OF THE INVENTION

The present invention provides a valve with a straightforward economical, sturdy, diaphragm type valve seal arrangement which can be used in a rising stem valve to limit the maximum opening of the valve. Furthermore, the present invention provides a valve arrangement where the maximum opening of the valve can be selectively adjusted to provide maximum flow without restriction of the operation of the valve between the fully open and fully closed positions where such adjustment is easily accomplished. Moreover, the present invention recognizes that in applications where it is desirable to provide a valve with means to limit the maximum flow through the valve and to periodically change the maximum flow limitation corrosion of the valve parts, including the valve stem, is particularly undesirable and the present invention provides a fluid flow control valve where the working elements are not subject to corrosion because such elements are insulated from flow of fluid through the valve.

Various other features of the present invention will become obvious to those skilled in the art upon reading the disclosure set forth hereinafter.

More particularly, the present invention provides a valve comprising: a valve housing defining a valve body having a fluid inlet, a fluid outlet, a valve bonnet opening and means defining a valve seat within the housing intermediate the fluid flow inlet and fluid flow outlet; valve bonnet means cooperatively attached to the valve bonnet opening of the valve body including sleeve means cooperatively disposed in aligned relation with the internal seat; valve stem means cooperatively received by the sleeve means and having detent means at a selected position thereon; means to move the stem means through the sleeve means; yoke means having cooperative aperture to receive the stem means in sliding relation and means to engage the detent means of the valve stem to restrict movement of the stem means through the aperture in a selected direction; means to adjustably fasten the yoke means to the bonnet means; and, diaphragm means disposed within the valve body across the bonnet opening to be urged to sealing relation with the valve seat by movement of the valve stem and to isolate the bonnet from the fluid flowing through the valve.

Referring to the drawings which show one example of the valve in accordance with the present invention;

Figure 1:
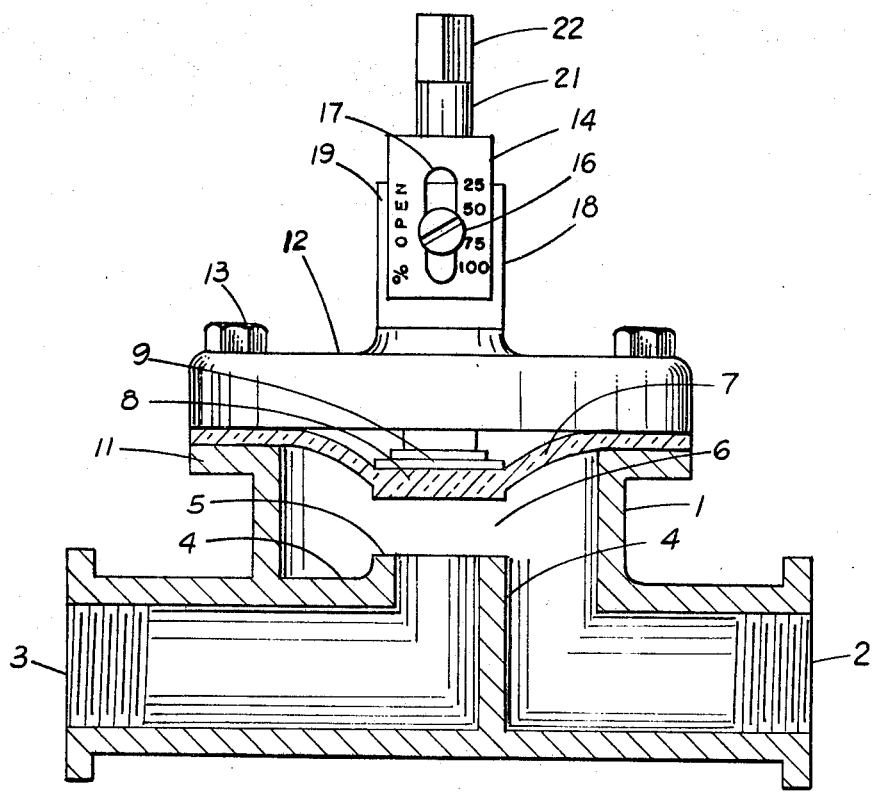
FIG. 1 is an elevational view, in section, of one example of a valve in accordance with the present invention.

One example of a valve in accordance with the present invention, as shown in FIG. 1, includes a housing 1 defining a valve body having fluid inlet and outlet means 2 and 3, which can be at opposite ends of the housing and can be provided with means, for example threads as shown, to attach the value into a cooperative piping system.

As shown in FIG. 1 valve housing 1 can provide a valve bonnet opening surrounded by a peripheral flange 11 adapted to receive a bonnet 12. Bonnet 12 is attached to flange 11 by means of bolts 13 and, advantageously, covers the entire opening defined by flange 11. Valve bonnet 12 includes a sleeve member 18 extending in generally aligned relation with valve seat 5 and provides internal threads, not shown, to receive an externally threaded valve stem 21, hereinafter described.

Figure 3:
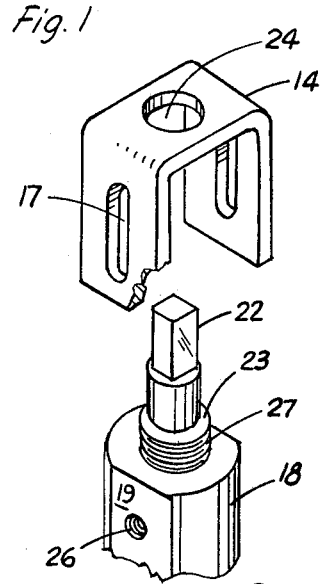
FIG. 3 is an exploded view of a portion of an example of a valve in accordance with the present invention.

Sleeve 18 is internally threaded and valve stem 21 is cooperatively threaded as shown in FIG. 3 to be received by sleeve 18 so stem 21 is moved laterally relative to valve seat 5 by rotation of the valve stem where the direction of movement is in accordance with the configuration of the threads and the direction of the rotation of the valve stem. A detent, for example shoulder 23, is provided on valve stem 21 to limit travel of the valve as hereinafter described.

A valve seat 5 is formed within housing 1 by cooperative wall means 4 so the fluid flowing through the valve passes through the aperture defined by the seat.

A diaphragm member 7 is provided to be retained between bonnet 12 and flange 11. Diaphragm 7 is co-extensive with the aperture defined by flange 11 so bonnet 12 and stem 21 are isolated from the fluid flowing through housing 1. As shown, diaphragm 7 can include a valve portion 8 to be urged toward valve seat 5 by valve stem 21 to regulate the opening of the valve and to be urged against the valve seat to terminate fluid flow through the valve.

Figure 2:
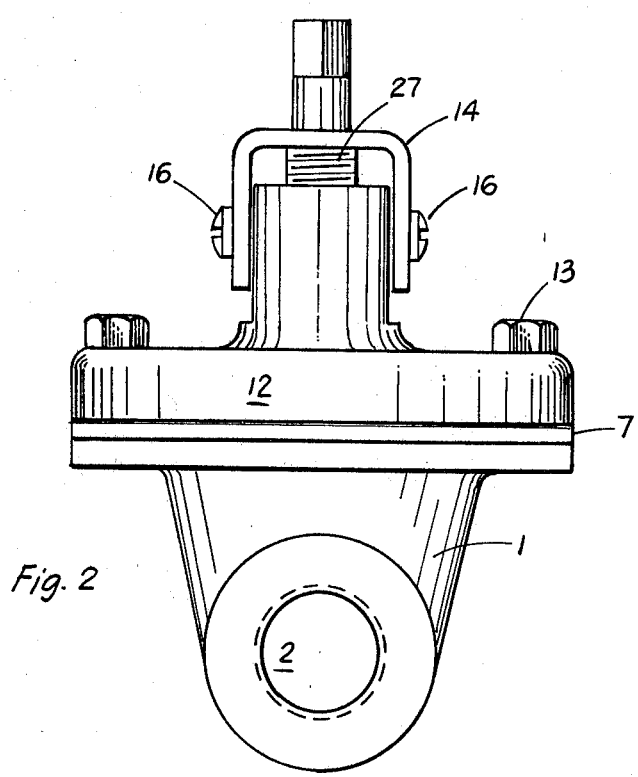
FIG. 2 is an end view of the valve shown in FIG. 1.

As best shown in FIG. 3 sleeve 18 can include flat surfaces 19 on opposite sides of the sleeve where each surface has a threaded hole 26 adapted to receive a screw 16 (FIGS. 1 and 2). A yoke 14 having an aperture 24 in the web portion is provided and aperture 24 is located to receive sleeve 21 in sliding relation. The spacing between the legs of yoke 14 is such that the yoke is slidably received by surfaces 19 of sleeve 18. The leg element of yoke 14 has cooperative slots 17 to receive screws 16 so yoke 14 can be moved longitudinally along sleeve 18 and can be retained in the selected position relative to sleeve 18 by tightening screws 16.

It will be noted from the figures that as valve stem 21 is rotated in a direction to withdraw the stem from sleeve 18 shoulder 23 eventually contacts yoke 14 to limit movement of the valve stem and, therefore, the maximum opening of the valve. By selective adjustment of yoke 14 on sleeve 18 the maximum opening of the valve can be established. As shown in FIG. 1 a scale can be provided on the side of yoke 14 to indicate the maximum opening of the valve which is indicated by the position of screw 16 on the scale which in the example of the figures indicates percent of fully open.

Valve stem 21 can be adapted to receive a valve handle to facilitate opening and closing the valve. As shown in the example of the figures, the stem can be a square end 22 and the valve handle can, advantageously, be easily removable to prevent tampering with the valve when it is in a selected position.

To adjust the valve opening screws 16 are loosened to permit movement of yoke 14 along sleeve 18 and valve stem 21 is rotated until the desired flow through the valve is achieved. Yoke 14 is then adjusted to abut shoulder 23 and screws 16 are tightened so the stem can be rotated to close the valve but the valve can be opened only to the point where shoulder 23 contacts the underside of yoke 14.

The invention claimed is:

1. A valve comprising: a valve housing defining a valve body having a fluid inlet, fluid outlet, a valve bonnet opening, and seat means defining a valve seat within the housing intermediate the fluid flow inlet and fluid flow outlet; valve bonnet means cooperatively attached to the valve bonnet opening of said valve body including sleeve means cooperatively disposed in aligned relation with said seat means; valve stem means to be cooperatively received by said sleeve means and having detent means at a selected location thereon; means to move said valve stem means through said sleeve means; yoke means of channel-shaped cross section with spaced, generally parallel legs extending transversely from the same side of an intermediate web wherein each leg means includes slot means extending transversely to said web portion and wherein said bonnet sleeve means is received between said leg means; means to adjustably and releasably fasten said yoke means to said bonnet sleeve means including fastener means extending through said slot means of said leg means and being received by said bonnet means so said yoke means can be moved longitudinally relative to said bonnet sleeve means and can be held in selected position on said bonnet sleeve means; and diaphragm means disposed within said valve body and across said bonnet opening to be urged to sealing relation with said valve seat by movement of said valve stem and to isolate said bonnet from said fluid going through said valve.

2. The valve of claim 1 wherein said detent means is a shoulder formed on said valve stem intermediate the ends of said stem and said aperture of said yoke means is adapted to receive a portion of said stem in sliding relation and to engage said shoulder means of said valve stem.

References Cited
UNITED STATES PATENTS

| | | | |
|---|---|---|---|
| 1,991,052 | 2/1935 | Derby | 251—285 X |
| 2,977,981 | 4/1961 | Jarrett | 251—285 X |
| 3,253,612 | 5/1966 | Luratola et al. | 251—285 X |

ARNOLD ROSENTHAL, Primary Examiner

U.S. Cl. X.R.

251—331